Dec. 8, 1964 H. E. LAWSON, JR 3,160,529
DEFERRED ACTION BATTERY

Filed Dec. 10, 1945 2 Sheets-Sheet 1

INVENTOR
HERBERT E. LAWSON, Jr.
BY
ATTORNEY

Dec. 8, 1964 H. E. LAWSON, JR 3,160,529
DEFERRED ACTION BATTERY
Filed Dec. 10, 1945 2 Sheets-Sheet 2

INVENTOR.
HERBERT E. LAWSON
BY
ATTORNEY

United States Patent Office 3,160,529
Patented Dec. 8, 1964

3,160,529
DEFERRED ACTION BATTERY
Herbert E. Lawson, Jr., Downers Grove, Ill., assignor to the United States of America as represented by the Secretary of the Navy
Filed Dec. 10, 1945, Ser. No. 634,118
6 Claims. (Cl. 136—90)

This invention relates generally to primary batteries of the one-fluid, deferred-action type and has particular relation to batteries of this type which are used in electrically operated projectiles and which become operative by the application of the forces of inertia and set-back imparted to projectiles when they are fired from a rifled gun barrel. The forces of inertia and set-back are utilized to initiate activation of the battery so that it will create electrical energy and supply the required voltage necessary for electrically detonating the projectiles.

It will be understood that in the preferred embodiment shown, the battery is designed for activation by the forces of set-back and spin generated by the projectile being shot from a rifled gun bore, but it will be understood that either set-back or spin may be utilized in causing activation of the battery and consequent electrical detonation of the explosive projectile.

An object of the present invention is to automatically convert an inactive primary battery in an unarmed projectile into an active battery in an armed projectile by instantaneously conducting electrolyte to the electrode elements of the battry.

Another object of the invetnion is to provide a delayed action battery having a plurality of electrode cell units arranged within the battery in such manner that they may be immediately and simultaneously contacted and activated by an electrolyte solution without obstruction by other elements of the battery.

A further object is to provide a delayed action battery assembly having a plurality of electrode cell units which assembly is so constructed as to permit the cell units to be immediately and simultaneously contacted by an electrolyte solution dispersed by centrifugal force.

Still another object is to provide for use in an electrically detonated projectile, a delayed action battery having a plurality of electrode cell units which are disposed parallel to the longitudinal axis of the projectile so as to permit the electrolyte to be maintained in contact with the electrodes by the action of centrifugal force caused by spinning of the projectile during flight.

A still further object is to provide a deferred action battery which is characterized by its positiveness in operation due to the novel arrangement of its elements.

These and other objects of the invention will be better understood by reference to the following description and accompanying drawing.

In a preferred form of the invention, the initially separated elements of the battery include an aqueous electrolyte solution containing the following components:

|  | Percent |
| --- | --- |
| Lithium bromide | 41 |
| Hydrobromic acid | 2 |
| Diamyl sodium sulfosuccinate (Aerosol AY) | 0.05 |
| Water to make up to 100%. | |

One electrolyte solution of this type is disclosed in my copending application Serial No. 505,225 filed October 6, 1943. It will be understood that the type of electrolyte chosen is dependent upon the electrode materials used.

The electrode assembly of the primary battery generally includes pairs of plates of dissimilar metals and paper separators, or pairs of plates having exterior coatings of dissimilar metallic material. While magnesium and silver electrodes, both in the form of plates and as coatings, have been successfully employed, other suitable electrode materials may be used which are operative with the particular electrolyte selected for use. For example, the electrodes may consist of steel plates or plates of plastic material on which are coated, by electrolysis or by sputtering, the coatings of electrode material.

In embodying the battery of the present invention in a projectile, the liquid electrolyte is initially and normally confined within a sealed, frangible ampoule which is surrounded by cell units having electrodes initially free from contact with the electrolyte solution, but readily and freely accessible to the electrolyte when the ampoule is broken by the force of set-back or spin, or both.

In the specific embodiment shown, the battery is mounted in the projectile along the line of its longitudinal axis and parallel with the line of travel of the projectile; the frangible ampoule is disposed with its longitudinal axis parallel with the longitudinal axis of the projectile; the ampoule is surrounded by parallel rectangular electrodes; and these longitudinally extending electrodes define parallel cells grouped about the ampoule as a center.

When the ampoule is broken, the liquid electrolyte is instantaneously diffused and uniformly distributed into contact with the electrodes for activation of the battery. By the uniform and universal distribution of the liquid electrolyte, which is of such predetermined amount that the cells will each be filled to a level short of its brim, short circuiting which might otherwise occur due to flooding is avoided, and maximum activation efficiency in a minimum period of time is assured.

In the accompanying drawing one example of the physical embodiment of the invention is illustrated, but it will be understood that changes and alterations may be made in this exemplifying description without departing from the principles of the invention. In the drawing.

Figure 1:
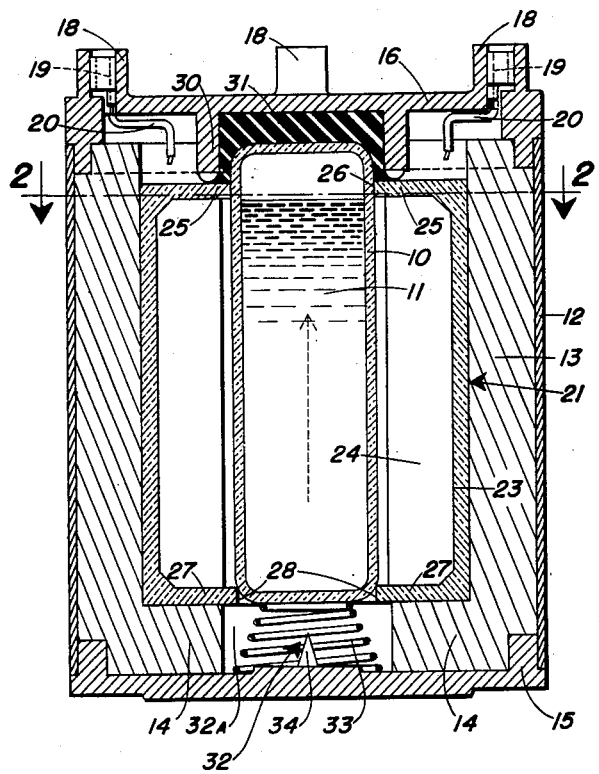
FIG. 1 is a longitudinal sectional view taken on the line 1—1 of FIGURE 2 of a battery assembly embodying the invention.

The battery assembly illustrated is designed for use in an electrically detonated bomb or projectile and is mounted therein with its longitudinal axis parallel with the longitudinal axis and the trajectory of the projectile as designated by the dotted arrow in FIG. 1.

Referring to the drawing, and particularly to FIG. 1, the glass ampoule 10 confines the liquid electrolyte 11, which is initially and normally sealed therein while the enclosing projectile (not shown) is in unarmed condition.

The battery assembly in which the ampoule is confined, includes an exterior, cylindrical metal casing 12 which surrounds a plastic cylinder 13 having an internal annular flange 14 at its base. The casing 12 is sealed at its base with a plastic cover plate 15 and the upper, open end of the casing is closed by a plastic turret cover plate 16, these parts being cemented and sealed at their joints.

The turrets 18 on the exterior of the turret plate 16 provide housings for the terminals 19 of the battery wires 20 and for the terminals of the conductors (not shown) of the electrically detonated means of the projectile.

Figure 3:
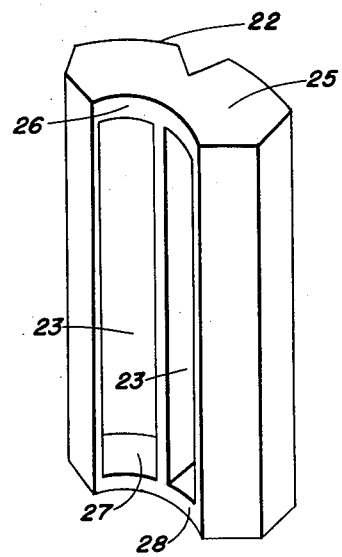
FIG. 3 is a perspective view of one of the electrode cell unit holder sections shown in FIGS. 1 and 2.
Figure 2:
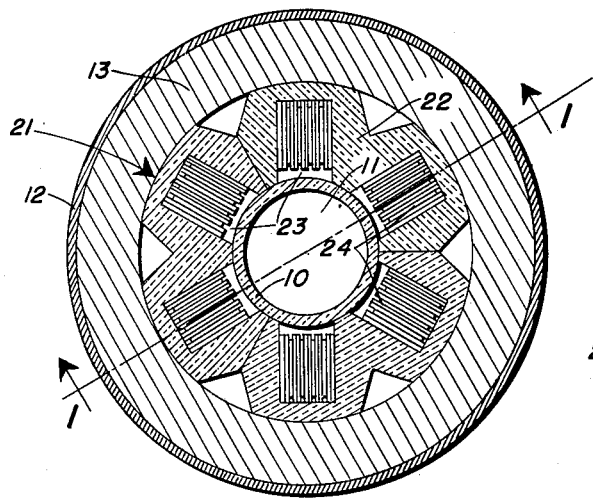
FIG. 2 is a transverse sectional view taken on the line 2—2 of FIG. 1.
Figure 5:
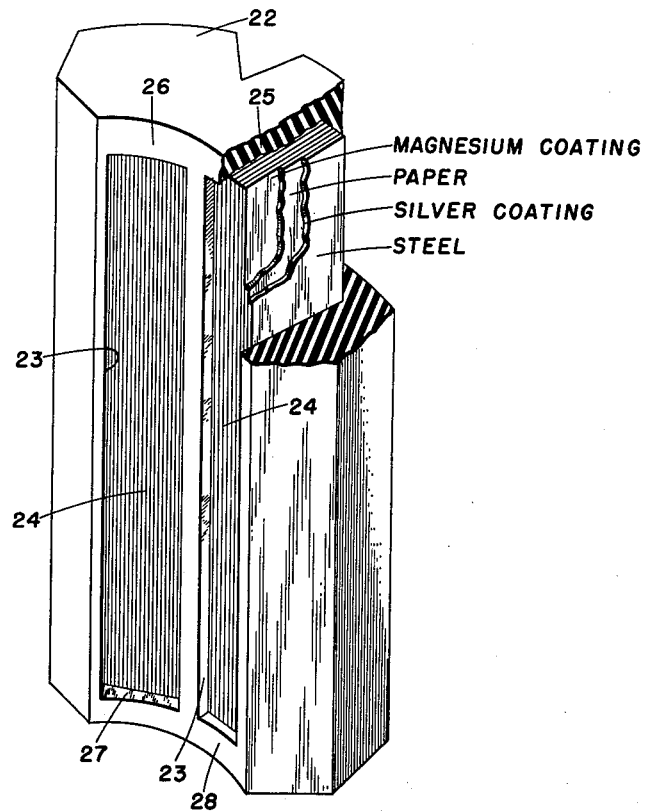
FIG. 5 is an enlarged detail perspective view of one of the electrode cell units holder sections with the electrodes therein, said section and certain of said electrodes being partially broken away to reveal the electrode arrangement.
Figure 6:
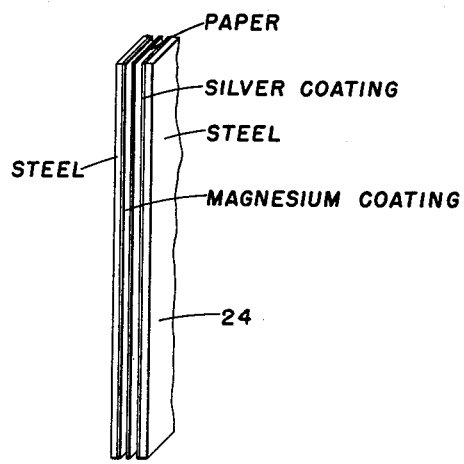
FIG. 6 is a detail perspective view, on an enlarged scale, showing the electrodes which form one of the cells.

As best seen in FIGS. 3, 5 and 6, within the cylinder casing 13 is mounted an electrode-holder 21, preferably made up of a number of sections 22 (FIG. 2) which are cemented together by a suitable bonding agent and shown as three in number. The sections 22 are composed of non-conducting, dielectric material, such as polystyrene, and are grouped radially about the ampoule 10. Each section 22 of the holder 21 is fashioned with a pair of inner, longitudinal, open and slots or grooves 23, shown as rectangular in cross section. The grooves 23 serve to accommodate the electrode cell units 24.

Figure 4:
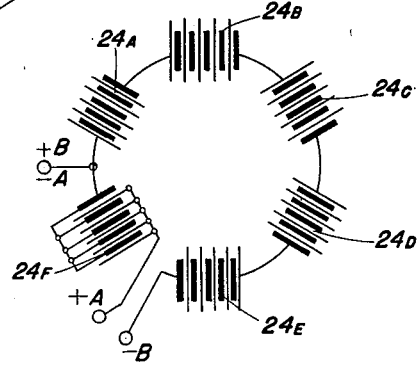
FIG. 4 is a diagrammatic view of the electrical circuit of the battery assembly shown in FIGS. 1 and 2.

In the preferred embodiment shown in FIG. 4, the multi-cell units 24a, 24b, 24c, 24d and 24e are electrically connected in series to provide a B voltage of a magnitude which is ample to energize the anodes of a plurality of vacuum tubes; while the individual cells of the cell unit 24f are connected in parallel to provide an A source for the filaments of said tubes.

The cell units 24 are radially disposed about the ampoule and circumferentially spaced with their inner, exposed edges adjacent the ampoule and in position to be directly contacted by the electrolyte solution as will be hereinafter described.

The cells of the cell units 24a, 24b, 24c, 24d and 24e are identical in formation and arrangement, so that a description of one will suffice for all. A typical cell is formed by a pair of plates, made of steel, plastic or other suitable material, on the opposing sides of which are coated, by electro-deposition of some other suitable method, the active electrode materials, such as magnesium and silver. The plates are, as shown in the drawings, of rectangular shape, the radial dimension, or width, of each plate being such that said plate will extend from the closed end of the groove 23 to a point near the mouth of said groove. The length, or longitudinal dimension, of each side plate is such that it will extend throughout the length of said groove 23. It should be understood, of course, that the plates each may be formed entirely of the active electrode material.

Each section 22 of the holder 21, as best seen in FIG. 3, is fashioned at its upper end with an inner, arcuate, transversely projecting flange 25. The arcuate flanges 25 form an annular ledge or rim 26 surrounding and positioning the upper end of the ampoule 10. The flanges 25 further serve to confine the liquid electrolyte 11 within the multi-cell holder 21 after the ampoule is broken. In similar fashion the bottom flange 27 serves to confine the electrolyte 11 within the multi-cell holder. The annular rim 28 of the flange 27 is also adapted to retain and position the ampoule 10 against accidental movement. The turret cover-plate 16 is provided with an inner ring 30 filled with a resilient material 31 such as sponge rubber to protect the ampoule from accidental breakage. The ring 30 also serves to retard diffusion of the electrolyte after the ampoule is shattered.

As shown in the drawing (FIG. 1), the ampoule is mounted longitudinally in the center of the battery in position to be shattered by impact against a breaker mechanism 32 contained within the well 32a of the cylinder flange 14. The breaker mechanism 32 comprises a resilient, coil spring 33 and a puncturing element 34 which is axially alined with the ampoule and spaced therefrom sufficiently so that setback force will depress the resilient spring 33 and cause a shattering impact between the ampoule and the puncturing element 34. A breaker mechanism of this type is more fully disclosed in copending application Serial Number 541,955, filed on June 24, 1944.

When a projectile containing the battery of the present invention is fired from a rifled gun barrel, the ampoule 10 is subject to the force of setback which causes it to depress the spring 33 and strike against the pointed disk 34 thereby breaking the ampoule. Shattering of the ampoule releases the electrolyte solution throughout the lengths of the surrounding cells and the available centrifugal force of the spinning projectile is utilized uniformly and universally to distribute the liquid away from the longitudinal axis of the battery into the grooves 23 and into the cell units 24 where the electrolyte contacts the electrodes, thereby initiating generation of electrical current. In the absence of any material obstruction to the fluent electrolyte, it is thus simultaneously thrown directly into and forcefully held in contact with all of the surrounding electrodes by centrifugal action, thereby instantaneously activating the battery, thus initiating the required detonation of the explosive projectile.

It is desired particularly to call attention to the fact that the volume of electrolyte will be so predetermined that, after activation of the battery, the amount of electrolyte in each cell unit will be such that there will be no excess which would flow between the cells and cause electrical short circuits. It is also desired to call attention to the fact that the above condition would prevail regardless of whether or not the electrode assemblies were contained entirely within the cell units. It is necessary, of course, that the electrolyte itself be contained fully within the cell units and free of the inner edges thereof to prevent said inter-cell leakage and consequent short circuits.

I claim:

1. In a deferred action battery, a casing, a frangible, sealed ampoule containing electrolyte positioned on the longitudinal axis of said casing, a plurality of electrodes defining multi-cells disposed about said ampoule and in said casing, each of the cells of said multi-cells having longitudinal edges presented toward said ampoule and said multi-cells being directly contacted between the cells by said electrolyte upon breakage of the electrolyte containing ampoule.

2. In a deferred action battery for use in an electrically detonated ordnance missile, a frangible, sealed ampoule containing electrolyte disposed along the longitudinal axis of said missile, a plurality of electrodes positioned about said ampoule, said electrodes having longitudinal edges presented toward said ampoule and being separated from the electrolyte solely by the ampoule, said electrolyte being released for direct contact between the electrodes upon breaking of the ampoule.

3. In a deferred action battery for use in an electrically detonated ordnance missile, a frangible, sealed ampoule containing electrolyte disposed along the longitudinal axis of said missile, a plurality of electrodes positioned about said ampoule, said electrodes having longitudinal edges presented toward said ampoule and being separated from the electrolyte solely by the ampoule, said electrolyte being released for direct contact between the electrodes upon breaking of the ampoule caused by the force of setback, said electrolyte being dispersed and maintained in contact with the entire surface area of the electrodes by the application of centrifugal force.

4. In a deferred action battery, a cylindrical casing of dielectric material provided with an axial borehole and a plurality of radial longitudinal slots communicating with the borehole, a frangible, sealed ampoule containing electrolyte disposed in said borehole, and a plurality of electrode units defining multi-cells positioned in said slots, said multi-cells being directly contacted by said electrolyte upon breaking of the ampoule.

5. In a deferred action, battery, a plurality of radial sections of dielectric material having at least one longitudinal slot, said sections being joined to define a casing of dielectric material provided with an axial borehole and a plurality of radial longitudinal slots communicating with the borehole, a frangible, sealed ampoule containing electrolyte disposed in said borehole, and a plurality of electrode units defining multi-cells positioned in said slots, said multi-cells being directly contacted by said electrolyte upon breaking of the ampoule.

6. In a deferred action battery, a casing, a frangible ampoule centrally disposed in the casing for containing a fluid electrolyte, a resilient seat in the casing at one end thereof for supporting the ampoule, a breaker in said end of the casing and engageable by the ampoule against the action of said seat upon the application of a force of setback to the ampoule, a plurality of generally arcuate sections of dielectric material fitted closely around the ampoule between the side wall thereof and the inner wall of the casing, each section having a longitudinal slot radiating from the ampoule, and a plurality of electrode units positioned in said slots, whereby upon breaking of the ampoule the electrolyte therein is adapted to be distributed directly into said slots to flood the electrode units.

References Cited by the Examiner
UNITED STATES PATENTS 2,403,567   7/46   Wales _____ 136—90.4

FOREIGN PATENTS 526,800   9/40   Great Britain.

OTHER REFERENCES

Kleiderer, C.: Modern Plastics, November 1945, pages 133, 136, and 206.

JOHN H. MACK, *Primary Examiner.*

R. L. GLASS, E. P. McDERMOTT, JAMES L. BREWRINK, *Examiners.*